(12) United States Patent
Akao et al.

(10) Patent No.: US 6,190,744 B1
(45) Date of Patent: Feb. 20, 2001

(54) PAPER CONTAINER FOR PHOTO-SENSITIVE MATERIALS AND PACKAGE OF PHOTO-SENSITIVE MATERIALS

(75) Inventors: Mutsuo Akao; Takashi Yoneyama, both of Kanagawa (JP)

(73) Assignee: Fuji Photo Film Co., Ltd., Kanagawa (JP)

( * ) Notice: Under 35 U.S.C. 154(b), the term of this patent shall be extended for 0 days.

(21) Appl. No.: 08/906,894

(22) Filed: Aug. 6, 1997

(30) Foreign Application Priority Data

Aug. 6, 1996 (JP) .................................................... 8-207221

(51) Int. Cl.[7] ............................... B32B 3/28; B32B 27/04; B32B 29/08

(52) U.S. Cl. .................. 428/34.2; 206/455; 229/122.32; 229/939; 428/34.3; 428/182; 428/184; 428/186; 428/542.8

(58) Field of Search .................................. 428/34.2, 182, 428/184, 186, 542.8, 34.3; 206/455; 229/939, 122.32

(56) References Cited

U.S. PATENT DOCUMENTS

| | | | |
|---|---|---|---|
| 2,178,447 | * 10/1939 | Burk et al. | 229/3.5 |
| 3,616,163 | * 10/1971 | Reisman | 161/133 |
| 3,775,145 | * 11/1973 | Ware et al. | 106/105 |
| 3,836,376 | * 9/1974 | Hampton et al. | 106/213 |
| 3,849,224 | * 11/1974 | Hintz et al. | 156/208 |
| 4,784,906 | * 11/1988 | Akao | 428/324 |
| 5,637,364 | * 6/1997 | Akao et al. | 428/34.2 |

\* cited by examiner

*Primary Examiner*—Nasser Ahmad
*Assistant Examiner*—Sandra M. Nolan
(74) *Attorney, Agent, or Firm*—Sughrue, Mion, Zinn, Macpeak & Seas, PLLC (57) ABSTRACT

A die-cut sheet having score lines and cutouts which in the form of a sheet of multilayered paperboard including at least two paper layers on the outer and inner sides that are made of different materials, that use a starch-based adhesive, preferably a cornstarch-based adhesive and that each have a basis weight of at least 150 g/m$^2$ is shaped into a box. The die-cut sheet is preferably in the form of a sheet of double-faced or double-wall corrugated board including 30 to 55 flutes/30 cm at a height of 2.3 to 5 mm and a takeup ratio of 1.30 to 1.65, with the liner and the medium having basis weights of 150 to 350 g/m$^2$ and 120 to 200 g/m$^2$, respectively. The box can be used as a paper container for photo-sensitive materials. Despite its use of waste paper, the box controls the possible adverse effects on the photographic properties of the contents, thereby allowing for effective control of the occurrence of damage and the generation of burrs of paper fragments and paper dust during the manufacturing, storage and shipment stages. In addition, using the starch-based adhesive of high bond strength, the box can be stored satisfactorily for a prolonged period.

8 Claims, 6 Drawing Sheets

( ∵ DIMENSIONS OTHER THAN ANGLE: mm )

PAPER CONTAINER FOR PHOTO-SENSITIVE MATERIALS AND PACKAGE OF PHOTO-SENSITIVE MATERIALS

BACKGROUND OF THE INVENTION

1. Field of the Invention

This invention relates to a paper container for photo-sensitive materials, particularly one that will not cause any adverse effects on the photographic properties of photographic materials, that are recyclable and that can control the generation of paper dust and other objectable matter. The invention also relates to a package of photo-sensitive materials.

2. Description of the Related Art

Paper containers, typically, corrugated boxes are employed for collective accommodation and shipment of a plurality of photo-sensitive materials and the only performance requirements that must be considered are that they should be adapted for protection, shipment and storage of a plurality of photo-sensitive materials as they are packed in a sealed condition by means of light-sealing packing members (e.g. sealable light shielding bags). The characteristics related to photographic performance are exclusively satisfied by multiple packaging utilizing packing members that package the individual photo-sensitive materials in a sealed condition as they are shielded from light, with another packing member occasionally inserted between the paper container and each of the packed photo-sensitive material for the specific purposes of providing moisture proofness and avoiding the entrance of paper dust and other contaminants.

In recent years, the storage and shipment considerations have raised the demand for greater savings in the floor space to be occupied by the paper containers of photo-sensitive materials. Other requirements are the adaptability to high-speed boxmaking and recyclability. In order to minimize the degree of multiple packaging for the purpose of meeting these demands, it is presently required that the paper containers of photo-sensitive materials which have heretofore had only the adaptabilities for protection, shipment and storage should also possess the performance characteristics required of other packing members. In addition to having recyclability and incinerability, the manufacturing cost of recent paper containers for photo-sensitive materials has to be reduced by the use of waste paper.

With respect to the currently employed paper containers such as corrugated boxes for providing good protection, storage and shipment of the packed photo-sensitive materials, burrs of paper fragments and paper dust that have developed in the interior of the containers during box making and carrying procedures will adhere to a person's hands or to packed photo-sensitive materials or will be suspended in the atmosphere when the containers are transported or opened. As a matter of fact, if the multiple packaging is avoided to eliminate the intermediate packing member, the aforementioned paper fragments and dust will adhere to the photo-sensitive layer of the photo-sensitive material as it is taken out of the opened package and clear spots and other photographically undesired effects will appear in the image to be produced on the photo-sensitive material.

In addition, the elimination of the intermediate packing member causes a problem in that due to the insufficient compressive strength of the paper container, the photo-sensitive materials in it are more likely to be affected by an external pressure, with the result that pressure fog occurs.

Other problems that have occurred include the lack of adaptability for efficient boxmaking (when waste paper is not used), as well as poor photographic properties, printability and appearance (when only waste paper is used).

SUMMARY OF THE INVENTION

The present invention has been accomplished under these circumstances and has as an object providing a paper container for photo-sensitive materials that are not only free from the aforementioned problems but are also capable of satisfying the added requirements of paper containers of the contemplated type such as those for higher possible production (boxmaking) speed, less curl in paperboard, higher wear resistance (better surface state of the completed box), better appearance and lower incidence of ruptures in score lines.

The present inventors conducted intensive studies in order to attain the stated object and found that the generation of paper fragments and dust could be most effectively controlled by utilizing a paper container for photo-sensitive materials that is produced by boxmaking a die-cut sheet that is made of a sheet of multilayered paperboard having a specified basis weight and which has score lines and cutouts. The present invention has been accomplished on the basis of this finding.

Briefly, the paper container of the invention for photo-sensitive materials is produced by boxmaking a die-cut sheet having score lines and cutouts formed on a sheet of multi-layered paperboard that includes at least two paper layers on the outer and inner sides that are made of different materials and each of which has a basis weight (JIS P8124) of 150 to 700 g/m$^2$.

DETAILED DESCRIPTION OF THE INVENTION

If each of the paper layers of multilayered paperboard from which the paper container of the invention is to be made has a basis weight of less than 150 g/m², the multilayered paperboard has insufficient compressive strength and, in addition, it is difficult to manufacture a sheet of multilayered paperboard; hence, the stated object of the invention cannot be attained.

The paper layer on the inner side of the multilayered paperboard preferably permits a greater degree of water adsorption than the paper layer on the outer side as measured by the Cobb test (JIS P8140). Semibleached and/or bleached pulp is used as part of the constituent material of the paper layer on the outer and inner sides and the paper layer on the outer side has a higher proportion of the semibleached and/or bleached pulp than the paper layer on the inner side. Such composition or characteristic contributes to faster saturation of an adhesive, thus increasing the boxmaking speed without deteriorating other characteristics. As a particular advantage, score lines can be formed easily enough to provide improved adaptability for boxmaking and yet curling, fracturing of score lines and the generation of paper dust can be prevented most effectively.

Preferably, the multilayered paperboard has a water content (JIS P8127) of 9±3% upon boxmaking, is composed of at least three paper layers, and contains a larger amount of sizing agent in the paper layers on the outer and inner surfaces than the center layer. In a particularly preferred case, the paper layer on the outer surface has a fiber length of 2.0 to 6.0 mm, a fiber diameter of 20 to 50 μm and a surface strength of at least 8A (as measured by the Method of Testing the Surface Strength of Paper and Paperboard specified in JIS P8129), with the multilayered paperboard having a density (JIS P8118) of 0.65 to 0.85, a Bekk smoothness (JIS P8119) of 3 to 15 seconds, and a delamination resistance (JIS P8139) of at least 5 kgf/cm².

Having these characteristics, the multilayered paperboard of the invention ensures wear resistance, printability and prevention of the generation of paper dust while exhibiting particularly good boxmaking characteristics, recyclability and effective prevention of curling and rupturing of score lines.

An appropriate paper container for photo-sensitive materials is manufactured by boxmaking a sheet of double-faced or double-wall corrugated board having liners made of multilayered paperboard having a basis weight (JIS P8124) of 150 to 350 g/m². A particularly appropriate paper container for photo-sensitive materials is manufactured by boxmaking a sheet of double-faced or double-wall corrugated board having 30 to 55 flutes/30 cm at a height of 2.3 to 5 mm, a takeup ratio of 1.30 to 1.65 and a basis weight (JIS P8124) of 120 to 270 g/m² in the medium.

The sheet of double-faced or double-wall corrugated board is preferably manufactured using starch-based adhesive. A particularly advantageous adhesive is such that a carrier solution A having 5 to 25 wt % of a starch swollen and broken down by means of heated water at 40 to 80° C. together with at least 0.2 to 2.0 wt % of sodium hydroxide and a main solution B having 20 to 40 wt % of a starch dispersed in warm water at 20 to 50° C. together with at least 0.3 to 2.0 wt % of borax are mixed in a ratio of A/B=0.3 to 0.7. The adhesive has the following characteristics: a water ratio of 2.0 to 5.0 (relative to the total starch content), a pH of 10 to 14, preferably 11 to 14, more preferably 12 to 14, and a Zahn cup viscosity (40° C.) of 15 to 60 sec, preferably 20 to 50 sec, more preferably 25 to 40 sec. The starch may be of any type that is selected from among natural starches (corn, potato, wheat, rice, tapioca, etc.), processed starches and starch derivatives. Corn starch is preferably employed since it is available in a consistent way, is inexpensive, will cause no adverse effects on the photographic properties of photographic materials and exhibits strong adhesive power.

Referring to the degree of water absorption, the outer layer of the liner has suitably a value of 16 to 50 g/m², preferably 20 to 46 g/m², more preferably 22 to 44 g/m², most preferably 25 to 40 g/m², as measured by the Cobb test (JIS P8140) for an absorption time of 2 min. The inner layer of the liner should be capable of absorbing water in an amount greater than a certain value when a sheet of corrugated board is to be manufactured at a high speed of at least 100 m/min using a cornstarch-based adhesive; the degree of water absorption by the inner layer as measured by the Cobb test (JIS P8140) for an absorption time of 2 min is at least 25 g/m², preferably at least 30 g/m², more preferably at least 35 g/m², most preferably at least 53 g/m².

If desired, the liner may be of a three-layered combination type, with the outer layer using unbleached kraft pulp and the inner layer using waste paper such as scrap corrugated board, crushed news, waste magazines, etc.

By manufacturing sheets of corrugated board according to the settings specified above, the requirements of interest can be satisfied in such aspects as the peel strength of adhesion between liner and medium, possible production (boxmaking) speed, curl, wear resistance (the surface of the completed box and the paper dust on it), appearance and the incidence of ruptured score lines.

The surface of blank sheets for making the above-described double-faced or double-wall corrugated box may be subjected to flexographic printing using a rubber plate or a resin printing plate, both having a rubber hardness of 30 to 55E, and a flexographic ink.

The paper container of the invention for photo-sensitive materials can be manufactured by the following process: the already-described adhesive which is such that carrier solution A having 5 to 25 wt % of a starch swollen and broken down by means of heated water at 40 to 80° C. together with at least 0.2 to 2.0 wt % of sodium hydroxide and main solution B having 20 to 40 wt % of a starch dispersed in warm water at 20 to 50° C. together with at least 0.3 to 2.0 wt % of borax are mixed in a ratio of A/B=0.3 to 0.7 is applied at a gelatinization temperature of 50 to 65° C. to both the single and double facers of a corrugating machine in a respective amount of 3.0 to 6.0 g/m² (to give a total amount of 6.0 to 12.0 g/m²) so that a liner having a basis weight of 150 to 450 g/m² is joined to both sides of a medium having a basis weight of 120 to 270 g/m², thereby forming a sheet of double-faced or double-wall corrugated board that has 30 to 55 flutes/30 cm at a height of 2.3 to 6 mm and a takeup ratio of 1.30 to 1.70; the sheet is then converted to a die-cut sheet having score lines and cutouts; and a box is made from the die-cut sheet.

In a particularly preferred embodiment, the sheet of double-faced or double-wall corrugated board is processed by means of a slitter-scorer and a cutoff into a rectangular shape, printed on a surface of the sheet and has the resulting burrs of paper fragments rejected by means of another cutoff having a pair of blades at least one of which has a plurality of notches indented at suitable spacings, thereby producing a die-cut sheet which is then converted into a box.

The present invention also relates to a package of photo-sensitive materials and, in a particularly advantageous embodiment, photo-sensitive materials weighing 10 kg are contained in a double-faced corrugated box made from a die-cut sheet for a sheet of double-faced corrugated board that has liners with a basis weight of 150 to 350 g/m², each comprising at least two paper layers on the outer and inner sides that are made of different materials and the corrugated box containing the photo-sensitive materials can be inclined at a sliding angle of 13 to 30 degrees as measured with a slide inclination angle meter.

Specific embodiments of the invention will now be described in detail with reference to the accompanying drawings.

Figure 1:
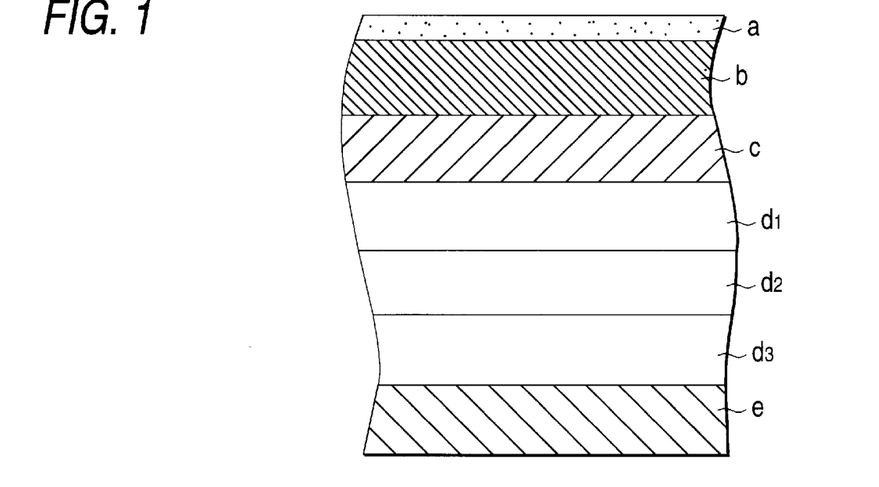
FIG. 1 is a cross section of white paper board according to an embodiment of the invention.

FIG. 1 shows an exemplary layer arrangement for the case where the multilayered paperboard of the invention is applied as white paper board, with the constituent pulp material being specified.

The white paper board illustrated in FIG. 1 utilizes waste paper in an amount of at least 50% so that it complies with Law for Promotion of Sorted Collection and Recycling of Container and Packaging and, in addition, it is inexpensive and has good adaptability for boxmaking (in such terms as foldability along score lines and glueability). The illustrated white paper board has intermediate layers d1, d2 and d3 sandwiched between an inner layer e and an outer layer b (plus the underlying layer c), with a coated layer a (e.g., coated with white pigments such as clear coated, cast-coated, satin white, titanium dioxide, calcium carbonate, zinc oxide, clay and aluminum hydroxide) being formed on top of the outer surface with a view to preventing the generation of paper dust and providing improved printability and commercial value. The multilayered paperboard having the white coated layer a formed on top of the outer surface is optimal for use in decorative surfaced boxes, such as small boxes for individual packaging of films of sizes 120 and 135, film units with lenses, APS films and instant film units, as well as boxes for individual packaging or collective packaging of these items.

Gray pulp from crushed news is used in the inner layer e so that it has an insect control capability and features improved creasability, water absorption characteristics and boxmaking speed without adversely affecting the properties photographic (of photo-sensitive materials). On the other hand, the intermediate layer which is inherently limited in the effect on photographic properties is composed of three layers d1, d2 and d3, each being substantially made of waste pulp from cheap magazines, such as to prevent photographic defects due to contamination and the like. The surface layer b is a white layer with more than 80% whiteness which is substantially made from bleached kraft pulp and the underlying layer c has more than 70% whiteness, being totally made of bleached pulp from deinked crushed news. Because of this compositional feature, the surface layer provides a high degree of color brightness in color printing, thus presenting no problem to commercial value.

Hence, taken as a whole, the multilayered paperboard of the invention, if it is used to pack photo-sensitive materials, will comply with Law for Promotion of Sorted Collection and Recycling of Container and Packaging while providing a good enough appearance to meet the requirement for sales promotion and, in addition, it is inexpensive and features good printing characteristics and high adaptability for boxmaking.

Figure 2:
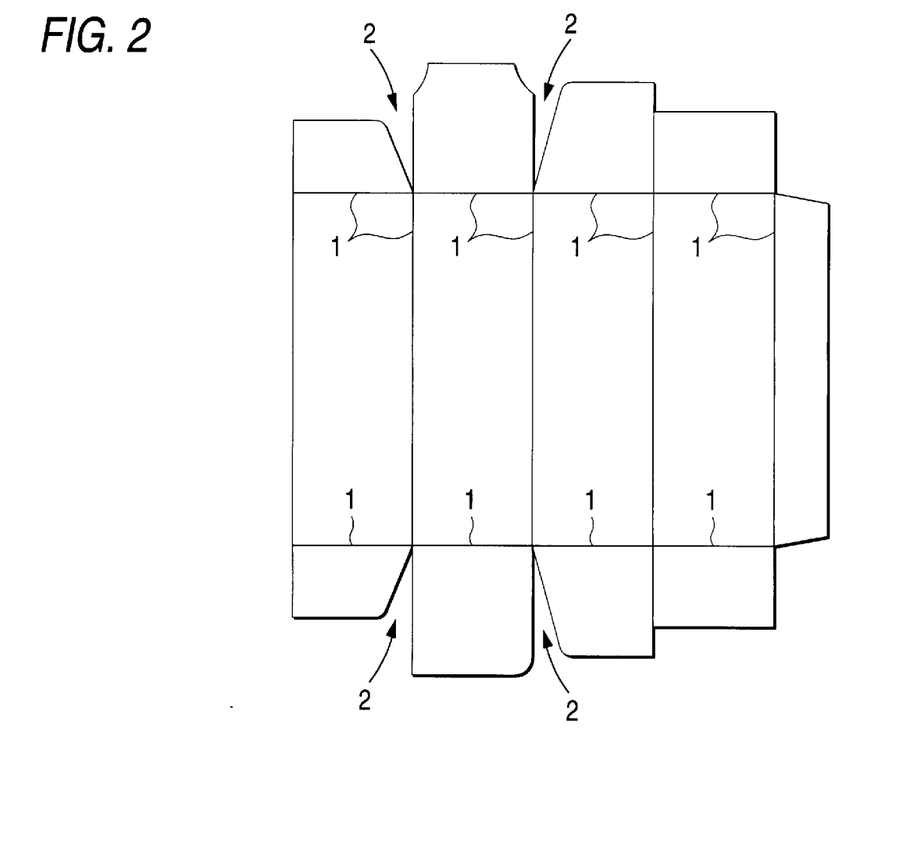
FIG. 2 is an exploded view of a small box for packing films of size 120 which utilizes the white paper board of the invention.
Figure 3:
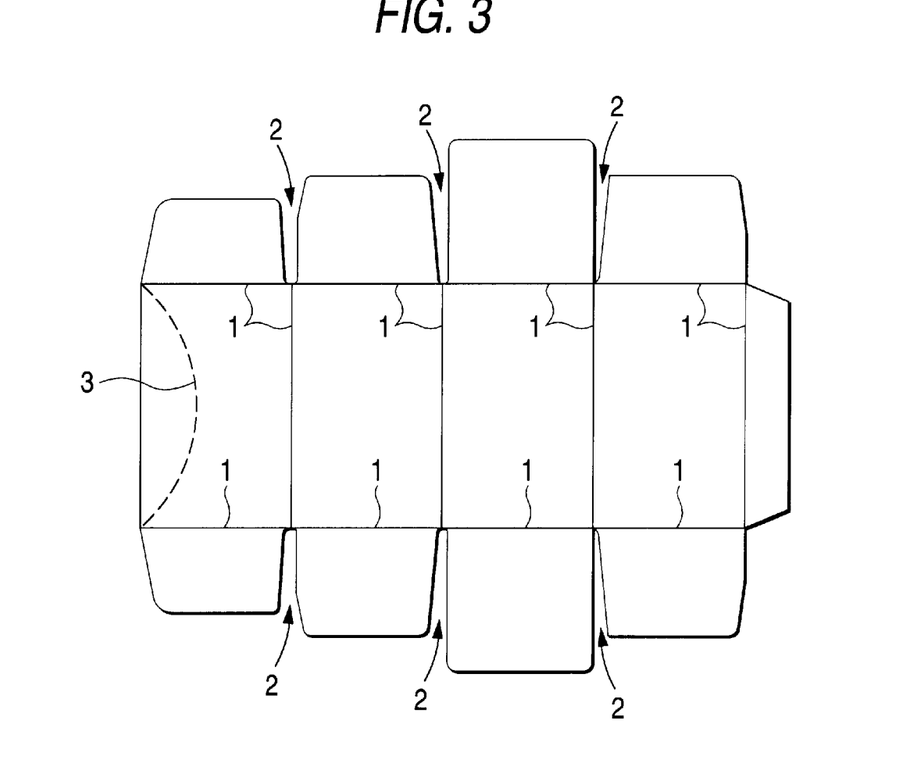
FIG. 3 is an exploded view of a small box for packing films of size 135 which utilizes the white paper board of the invention with perforations made to facilitate box opening.

If the multilayered paperboard of the invention is to be used on decorative surfaced boxes, it typically has a basis weight of 150 to 700 g/m$^2$, preferably 170 to 600 g/m$^2$, more preferably 200 to 550 g/m$^2$, most preferably 250 to 500 g/m$^2$. The decorative surfaced box on which the multilayered paperboard is to be used is manufactured by boxmaking a die-cut sheet having a plurality of score lines 1 and cutouts 2 as shown in FIGS. 2 and 3. If necessary, in order to facilitate box opening, perforations may be provided as indicated by 3 in FIG. 3.

The score lines to be formed on the decorative surfaced box may have the following dimensions: a male score line width of 0.3 to 1.2 mm, preferably 0.4 to 1.1 mm, more preferably 0.5 to 1.0 mm, most preferably 0.6 to 0.9 mm; a female score line width of 0.7 to 1.8 mm, preferably 0.9 to 1.6 mm, more preferably 1.0 to 1.5 mm, most preferably 1.1 to 1.4 mm; a score line depth of 0.2 to 0.8 mm, preferably 0.25 to 0.7 mm, more preferably 0.3 to 0.6 mm, most preferably 0.35 to 0.5 mm.

Offset printing is the most preferred method of printing to be done on the multilayered paperboard when various considerations such as adaptability for high-speed multicolor printing, print quality and cost are taken into account. Other applicable methods are letterpress printing, gravure printing and flexographic printing. Various types of ink may be employed such as UV inks, oil-based inks and water-soluble inks. Typical examples of synthetic resins that may be employed as inks include vinyl chloride based copolymer resins, vinyl-amino resins, alkyd-vinyl resins, oil-free alkyd resins, vinyl chloride-vinyl acetate resins, nitrocellulose, polyesters, polyamide-urethane resins, polyacrylic resins, rosin-modified maleic acid resins, ethylene-vinyl acetate resins, vinyl ether resins, urethane-vinyl acetate resins, vinyl chloride-vinyl acetate-urethane resins, modified alkyd resins, modified phenolic resins, high-molecular weight polyester-amino resins, low-molecular weight polyester-amino resins, alkali-soluble resins (e.g. rosin-modified maleic acid resins, styrene-maleic acid resins, styrene-acrylic acid resins, acrylate ester-acrylic acid resins and methacrylate ester-acrylic acid resins), hydrosol-type resins (e.g. styrene-maleic acid resins, styrene-acrylic acid resins, α-methylstyrene-acrylic acid resins, acrylate ester-acrylic acid resins and methacrylate ester-acrylic acid resins) and emulsion-type resins (e.g., styrenic resins, styrene-acrylate ester resins, acrylate ester copolymer resins and methacrylate ester copolymer resins).

As a surface sizing agent, carboxy-modified polyvinyl alcohol may typically be applied in a preferred amount of 0.05 to 2.0 g/m$^2$.

The multilayered paperboard is also available on the market and typical commercial products include COAT BOARD, UF COAT, MARICOAT, ULTRA H and JET STAR. For instance, small boxes for films of size 120 may typically be made of "MARICOAT" (Hokuetsu Paper Mills Ltd.) which utilizes 270 g of COAT BOARD; an exploded view of such a box is shown in FIG. 2. As another example, small boxes for films of size 135 may typically be made of "JET STAR" (Daishowa Paper Mfg. Co., Ltd.) which utilizes 270 g of COAT BOARD; an exploded view of such a box is shown in FIG. 3.

We now describe examples of the case where the multilayered paperboard of the invention is applied as corrugated board.

EXAMPLE 1

Corrugated board was prepared by joining a liner of kraft pulp to both sides of a medium solely made from semichemical pulp.

(α: Specific composition of typical liner having a basis weight of 320 g/m$^2$)

Figure 4:
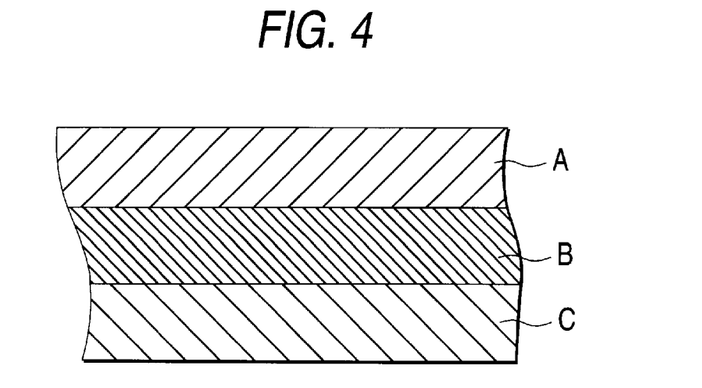
FIG. 4 is a cross section of the liner of the corrugated board made in Example 1 of the invention.

As shown in FIG. 4, the liners employed in Example 1 are each composed of an outer layer A, a middle layer B and an inner layer C. The outer layer A is entirely composed of virgin unbleached pulp and surface sized with carboxy-modified polyvinyl alcohol, having a yellow color in appearance. The inner layer C is entirely composed of scrap corrugated board and surface sized in the same manner as the outer layer A, but having a brown color in appearance. The middle layer B is entirely composed of scrap corrugated board but not sized on the surface.

The strength of delamination between the outer layer A and the middle layer B was 183 gf/15-mm width, and that of delamination between the middle layer B and the inner layer C was 175 gf/15-mm width. The peel strength of the middle layer B itself was 146 gf/15-mm width. Typical characteristics of the liner were as follows:

basis weight, 320 g/m$^2$; thickness, 408 μm;
density, 0.8 g/m$^3$; smoothness (outside), 7 sec;
water content, 7.5%;
wear resistance (outside), 200 abrasions;
delamination strength of liner, 165 g/15-mm width;
surface strength (outside), 17A;
surface strength (inside), 11A;
bursting strength, 11 kg/cm$^3$;
breaking length (longitudinal), 8.5 km;
breaking length (transverse), 2.5 km;
tearing strength (longitudinal), 407 g;
tearing strength (transverse), 518 g;
folding strength (longitudinal), 3358 bends;
folding strength (transverse), 2628 bends;
water absorption by the Cobb test (outside), 28 g/m$^2$; and
water absorption by the Cobb test (inside), 35 g/m$^2$.

(β: Data for typical medium having a basis weight of 180 g/m$^2$)

basis weight, 181 g/m$^2$;
thickness, 275 μm;
density, 0.66 g/m$^3$;
water content, 8.2%;
breaking length (longitudinal), 7.5 km;
breaking length (transverse)≧2.8 km;
tearing strength (longitudinal)≧167 g;
tearing strength (transverse)≧198 g;
water absorption by the Cobb test (outside), 218 g/m$^2$; and
water absorption by the Cobb test (inside), 215 g/m$^2$.

The adhesive used to join the liner to both sides of the medium was such that a carrier solution having 14 wt % of a starch swollen and broken down by means of heated water at about 55° C. together with 1.9 wt % of sodium hydroxide and a main solution having 30 wt % of a starch dispersed in warm water at about 30° C. together with 0.7 wt % of borax were mixed in a ratio of 1:0.5. Thus, the adhesive was a cornstarch glue that had a comparatively low viscosity (28 sec in terms of Zahn cup viscosity) and a high concentration (water was present in about three times the total volume of the starch).

Using the machine settings (full contact saturation bonding; open time, 1/2.5 sec; closed time, 2 sec; gelatinizing temperature, 55 to 60° C.; coating amount, 4.5 to 5.5 g/m$^2$), the liners were adhered and laminated to both sides of the medium, thereby fabricating a sheet of A flute, double-faced corrugated board having 35 flutes/30 cm at a height of 4.6 mm and a takeup ratio of 1.58.

Rectangular sheets were cut from the sheet of double-faced corrugated board by means of a slitter-scorer and a cutoff. Subsequently, surfaces of the sheets were subjected to flexographic printing using a rubber plate or a resin printing plate, both having a spring hardness Hs 30–35 (JISA) as measured by the method specified in JIS K6301-1995, and a flexographic ink. Then, die-cut sheets for corrugated boxes were made as shown in the exploded view of FIG. 9, which had a tearing portion 34 (also see FIG. 7) and a plurality of score lines 1 and cutouts 2, with either a sensor mark being printed or a print being made to produce a visible sheet direction indicating mark. The individual die-cut sheets were subjected to the usual boxmaking procedures to fabricate paper containers (corrugated boxes) for photo-sensitive materials.

EXAMPLE 2

A sheet of double-faced corrugated board capable of absorbing water in an amount of 18 g/m$^2$ on the outer side and 30 g/m$^2$ on the inner side as measured by the Cobb test was prepared by changing the liner of Example 1 to multi-layered paperboard of which the outer and inner layers were both made of virgin unbleached kraft pulp whereas the middle layer was made of pulp from scrap corrugated board.

EXAMPLE 3

A sheet of double-faced corrugated board capable of absorbing water in an amount of 44 g/m$^2$ on the outer side and 53 g/m$^2$ on the inner side as measured by the Cobb test was prepared by changing the liner of Example 1 to multi-layered paperboard of which the outer, middle and inner layers were made of pulp from scrap corrugated board, and the outer and inner layers are surface sized.

EXAMPLE 4

A sheet of double-faced corrugated board capable of absorbing water in an amount of 25 g/m$^2$ on the outer side and 62 g/m$^2$ on the inner side as measured by the Cobb test was prepared by modifying the sizing agent and pulp in each of the outer and inner layers of the liner of Example 1.

COMPARATIVE EXAMPLE 1

A sheet of double-faced corrugated board capable of absorbing water in an amount of 20 g/m$^2$ on the outer side and 18 g/m$^2$ on the inner side as measured by the Cobb test was prepared under the same conditions as in Example 1, except that the outer and inner layers of each liner were solely composed of virgin unbleached kraft pulp of the same origin.

COMPARATIVE EXAMPLE 2

A sheet of double-faced corrugated board capable of absorbing water in an amount of 65 g/m$^2$ on the outer side and 62 g/m$^2$ on the inner side as measured by the Cobb test was prepared under the same conditions as in Example 1, except that the outer and inner sides of each liner were made of the same material (scrap corrugated board).

COMPARATIVE EXAMPLE 3

A sheet of double-faced corrugated board capable of absorbing water in an amount of 53 g/m$^2$ on the outer side and 44 g/m$^2$ on the inner side as measured by the Cobb test was prepared as in Example 3, except that the constituent material of the outer layer was changed to that of the inner layer and vice versa.

COMPARATIVE EXAMPLE 4

A sheet of double-faced corrugated board capable of absorbing water in an amount of 32 g/m$^2$ on the outer side and 18 g/m² on the inner side as measured by the Cobb test was prepared as in Example 2, except that the constituent material of the outer layer was changed to that of the inner layer and vice versa.

Table 1 is a comparison table for Examples 1 to 4 and Comparative Examples 1 to 4.

TABLE 1

| Parameter | Example |  |  |  | Comparative Example |  |  |  |
|---|---|---|---|---|---|---|---|---|
|  | 1 | 2 | 3 | 4 | 1 | 2 | 3 | 4 |
| Water absorption by the outer layer, g/m² (2 min) | 28 | 18 | 44 | 25 | 20 | 65 | 55 | 32 |
| Water absorption by the inner layer, g/m² (2 min) | 35 | 30 | 55 | 65 | 18 | 62 | 44 | 18 |
| Constituent materials of the outer and inner layers | different | different | different | different | same | same | different (reverse to Ex. 3) | different (reverse to Ex. 2) |
| Bond strength | ○ | · | ○ | ○ | X | ○ | ○ | X |
| Adaptability for the making of a sheet of corrugated board | ○ | · | ⊚ | ⊚ | X | ⊚ | ○ | X |
| Curl of a sheet of corrugated board | ○ | ⊚ | · | ○ | ○ | ▲ | ▲ | ○ |
| Wear resistance of a sheet of corrugated board | ○ | ⊚ | ○ | ○ | ⊚ | X | X | ▲ |
| Appearance | ○ | ○ | ○ | ○ | ○ | ▲ | ▲ | ▲ |
| Strength of score lines | ○ | ○ | ○ | ○ | ○ | X | ▲ | ▲ |

⊚, excellent; ○, good; ·, practically acceptable; ▲, problematic and needs improvement; X, practically infeasible The Cobb test for measuring water absorption is conducted in accordance with JIS P8140. The criteria for evaluation of the other characteristics set forth in Table 1 were as follows: the bond strength was evaluated on the basis of the delamination strength between the liner and the flutes (of the medium); the adaptability for the making of a sheet of corrugated board was evaluated on the basis of a possible production speed (a guide figure is 150 m/min) and the state of bonding; the curl of a sheet of corrugated board was evaluated on the basis of the curling that occurred to the sheet of corrugated board after 1-day standing; the wear resistance of the sheet of corrugated board was evaluated on the basis of the surface state of a completed box and the extent of paper dust generation on the box; the appearance was evaluated on the basis of the color and surface state as examined visually; and the strength of score lines was evaluated on the basis of the incidence of rupturing of score lines in a boxmaking test.

As one can conclude from Table 1, the liner is preferably of a multilayered structure in which the inner layer absorb is adapted to more water than the outer layer when measured by the Cobb test.

EXAMPLE 5

In this example, a liner α and a medium β which respectively had the aforementioned characteristics were employed to prepare a sheet of A flute double-faced corrugated board having 35 flutes/30 cm at a height of 4.6 mm and a takeup ratio of 1.58, and the moisture absorbing capability of the sheet was investigated.

Figure 5:
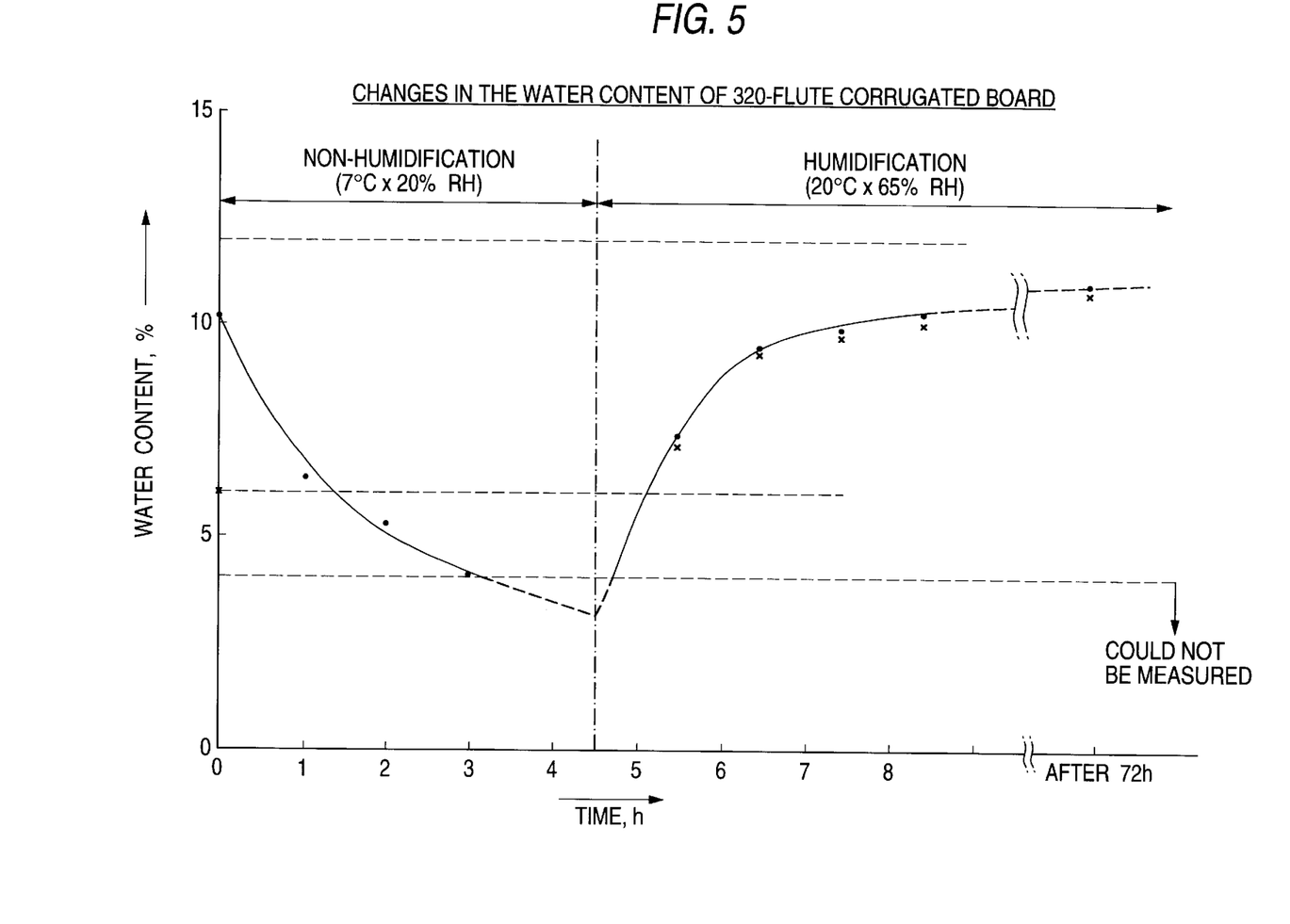
FIG. 5 is a graph showing the relationship between the environment of storage of the corrugated board made in Example 5 of the invention and the water content of the board.

FIG. 5 shows a relation of the storage environment of the corrugated board that consists of liners α and medium β and which has the design features just described above and the water content of the board. As one can see from the graph, when no humidification was performed and the humidity remained at low level (e.g. 20% R.H.), the water content of the corrugated board became lower than 6% upon 1 hour passage since the preparation of the sheet of corrugated board and, therefore, ruptured score lines and curling which would prevent satisfactory boxmaking occurred when the boxmaking operation was not completed within one hour. When humidity control was performed by keeping an appropriate humidity (65% R.H.) for at least 1 hour, the water content of the corrugated board was held between 6 and 12% and neither ruptured score lines nor curling occurred.

The individual characteristic values of the sheet of corrugated board have the following possible ranges:

basis weight, 260 to 350 g/m²;
thickness, 350 to 525 μm;
density, 0.65 to 0.90 g/m³
smoothness (outside), 3 to 15 sec;
water content, 6 to 12%;
wear resistance (outside)≧150 abrasions;
delamination resistance of liner≧100 g/15-mm width;
surface strength (outside)≧12 A;
surface strength (inside)≧8A;
bursting strength≧5 kg/cm³;
breaking strength (longitudinal)≧6 km;
breaking strength (transverse)≧1.5 km;
tearing strength (longitudinal)≧300 g;
tearing strength (transverse)≧400 g;
folding strength (longitudinal)≧2,000 bends;
folding strength (transverse)≧1,500 bends;
water absorption by the Cobb test (outside), 16 to 50 g/m²; and
water absorption by the Cobb test (inside), 25 to 150 g/m².

The preferred ranges are as follows:
basis weight, 280 to 330 g/m²;
thickness, 370 to 450 μm;
density, 0.65 to 0.90 g/m³;
smoothness (outside), 5 to 12 sec;
water content, 6.5 to 10%;
wear resistance (outside)≧170 abrasions;
delamination resistance of liner≧130 g/15-mm width;
surface strength (outside)≧14A;
surface strength (inside)≧9A;

bursting strength ≧ 7 kg/cm³;
breaking length (longitudinal) ≧ 7 km;
breaking length (transverse) ≧ 2 km;
tearing strength (longitudinal) ≧ 350 g;
tearing strength (transverse) ≧ 450 g;
folding strength (longitudinal) ≧ 2,500 bends;
folding strength (transverse) ≧ 2,000 bends;
water absorption by the Cobb test (outside), 20 to 46 g/m²; and
water absorption by the Cobb test (inside), 30 to 140 g/m².

We next describe the corrugated box to be made from the sheet of corrugated board of Example 1 which is composed of the above-specified liner α and medium β.

Figure 6:
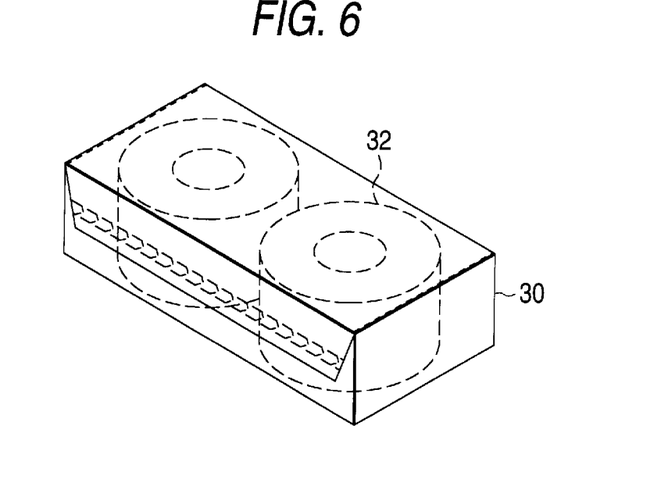
FIG. 6 is a perspective view of a corrugated box that contains photo-sensitive material according to the invention.

FIG. 6 is a perspective view of the corrugated box as it contains a photo-sensitive material. As shown, the corrugated box 30 contains in it the photo-sensitive material 32 which may be a roll of photographic color paper 12.7 cm wide and 180 m long which is packed in a moistureproof light-shielding bag. Two rolls of such packed photographic paper are contained in the corrugated box 30, which weighs 10 kg in total and is complete as a wrap around package of the photo-sensitive material. In the case shown, two rolls of color photographic paper are contained in the corrugated box 30 but this is not the sole case of the invention and the rolls may be contained in fours or sixes. If more than two rolls of photographic color paper 32 are to be contained in the corrugated box 30, the rolls are preferably stacked in such a way that the curved side of one roll contacts that of another only along a line rather than the flat bottom of one roll being placed on the flat top of another roll and this is in order to reduce the possibility that the packing of the rolls will become loose or damaged during shipment and other handling procedures.

Figure 7A:
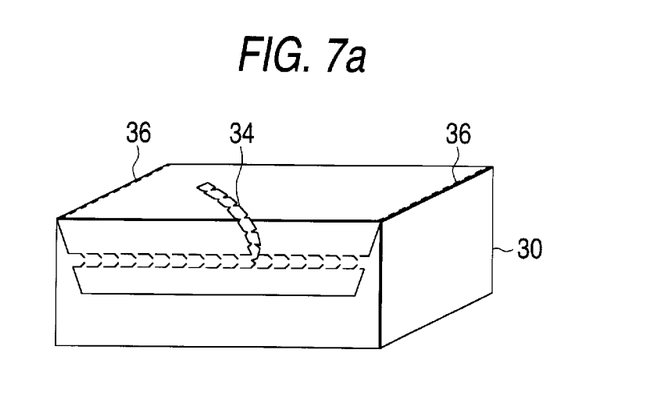
FIG. 7a is a perspective view of the corrugated box of FIG. 6 as it is being torn open.
Figure 7B:
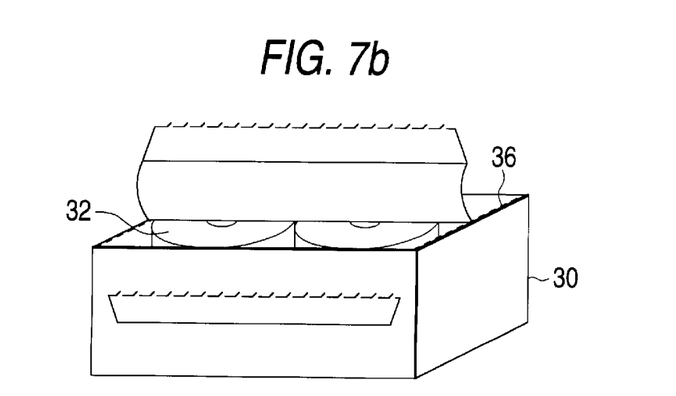
FIG. 7b is a perspective view of the same corrugated box except that it has been torn open.

FIG. 7 shows in perspective view how the corrugated box 30 is opened. First, as shown in FIG. 7a, the tearing portion 34 of the corrugated box 30 is pulled to tear from the box. Then, as shown in FIG. 7b, side tearing portions 36 on the two sides of the top surface of the box 30 which serves as the top cover are torn open to ensure that the photo-sensitive material 32 can be easily taken out of the box 30.

Figure 8:
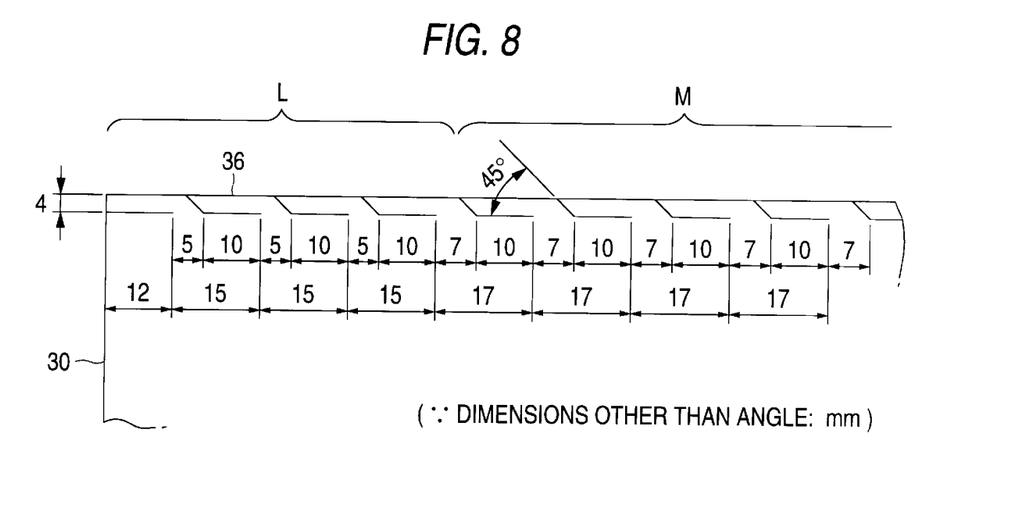
FIG. 8 shows enlarged the tearing portion of the corrugated box of FIG. 6.

FIG. 8 shows the shape of the tearing portion. The tearing portion must satisfy two seemingly inconsistent requirements, one for minimizing its breakage which may occur when the corrugated box is dropped or otherwise handled inadvertently and the other requirement being for accomplishing easy opening of the box. The side tearing portion 36 is shown specifically in FIG. 8: the pulling end portion L and the remaining portion M are each provided with cuts but the pitch of the cuts in the portion L which is 5 mm is shorter than the pitch of the cuts in the portion M; as a result, the pulling end portion L can be gripped easily to tear the box open whereas the remaining portion M is provided with a sufficient strength to reduce the possibility that the side tearing portion 36 breaks when the corrugated box 30 is dropped or otherwise handled inadvertently.

Figure 9:
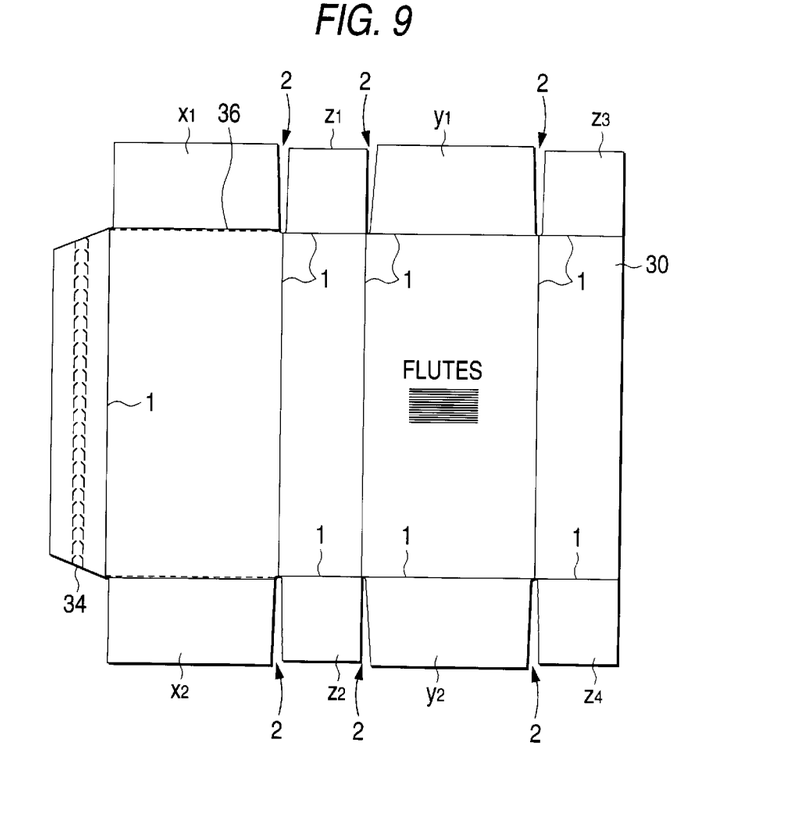
FIG. 9 is an exploded view of the same corrugated box.

FIG. 9 is an exploded view of the corrugated box shown in FIG. 6. As shown, the flutes are formed along the shorter sides of the box in order to increase its strength. To make the box, a wrap around system is employed, that is, the flaps x1,y1,z1 and z3 are bonded while, at the same time, flaps x2,y2,z2 and z4 are bonded.

Between the package of a photo-sensitive material and the corrugated box which was constructed from the sheet of corrugated board composed of the liner α and the medium β and which contained the photo-sensitive material, the coefficient of friction which would develop when the package was placed on the sheet of corrugated board was tested. The contents of the package were two rolls of color photographic paper 12.7 cm wide and 180 m long; the total weight of the package was 10 kg, with the corrugated box being of a wrap around type. In the friction test, the angle of slide inclination was measured with a device of the configuration shown in FIG. 10; the test results are shown in Table 2.

Figure 10:
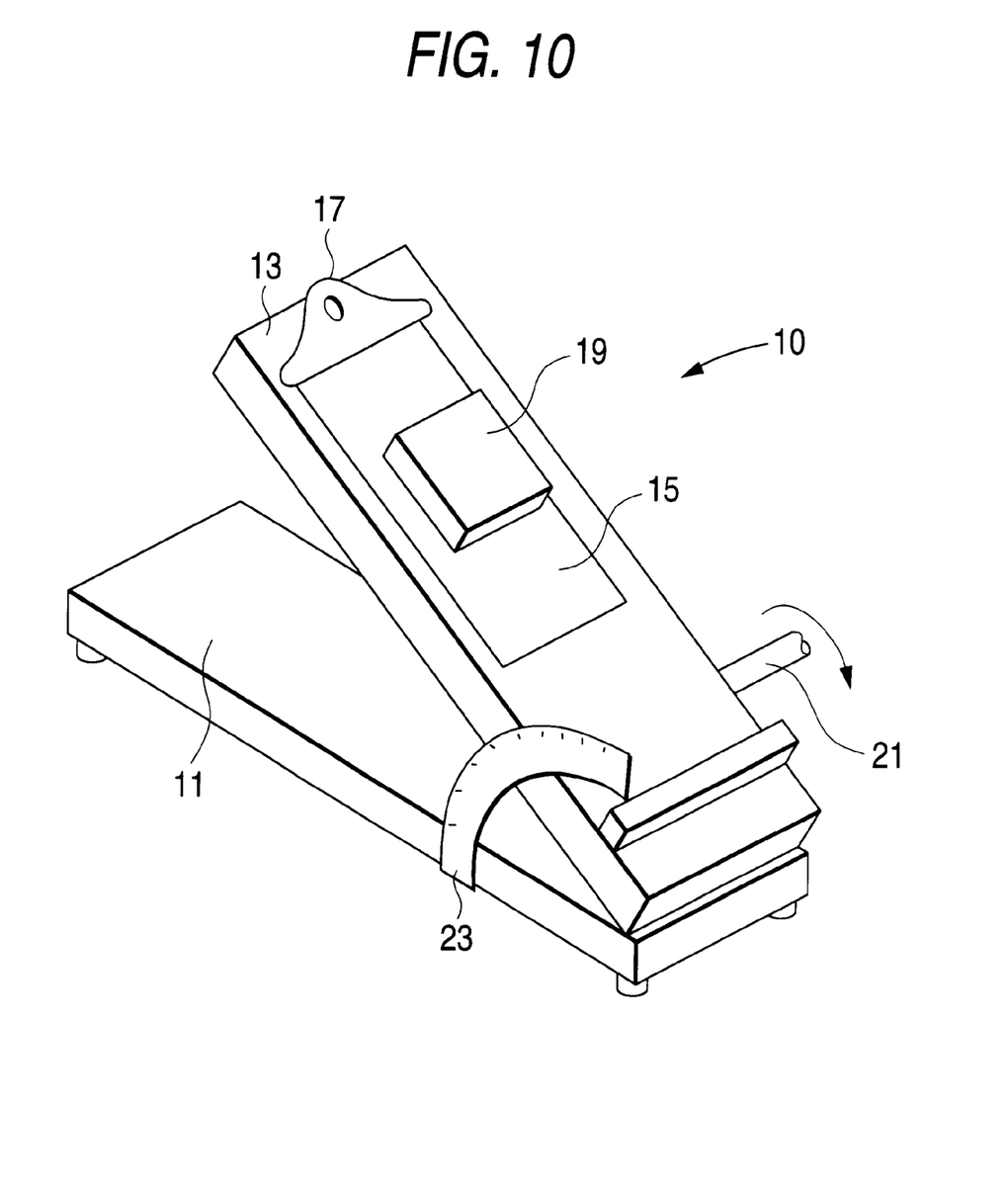
FIG. 10 is a perspective view of a device for measuring the angle of slide inclination.

The device for measuring the angle of slide inclination which is generally indicated by 10 in FIG. 10 comprises a platform 11, an angle adjuster 13 supported pivotally on an end of the platform 11 and a clip 17 which grips the sheet of corrugated board 15 on top of the angle adjustor 13 for measurement. After the package of photo-sensitive material 19 is placed on the sheet of corrugated board 15, the angle adjuster 13 is pivoted upward on a shaft 21 and the gradually increasing angle of slide inclination is read on a dial 23. In FIG. 2, the items 1 to 5 show the sheets of corrugated board according to the present invention, the items (1) to (5) show the rounds of the test.

TABLE 2

|  | (1) | (2) | (3) | (4) | (5) | Mean |
| --- | --- | --- | --- | --- | --- | --- |
| 1 | 14.0 | 14.5 | 14.5 | 14.5 | 14.5 | 14.4 |
| 2 | 19.5 | 18.0 | 19.5 | 18.0 | 18.0 | 18.6 |
| 3 | 17.5 | 16.0 | 17.0 | 16.5 | 16.0 | 16.6 |
| 4 | 17.5 | 16.0 | 16.0 | 16.0 | 16.0 | 16.3 |
| 5 | 16.5 | 16.0 | 15.5 | 15.0 | 15.5 | 15.8 |
| Mean | 17.0 | 16.0 | 16.5 | 16.1 | 16.0 | 16.3 |

Having the angles of slide inclination set forth in Table 2, the packages of photo-sensitive material, when in contact with each other, would develop a sufficient frictional force to prevent the packing of the contents from becoming loose during subsequent converting and packaging steps and shipment process. The angle of slide inclination could be further increased by applying the coating agents listed in Table 3 during production of the packaging of the photo-sensitive material.

TABLE 3

| Step of corrugated board making | Typical coating agents | Results |
| --- | --- | --- |
| Linerboard making (with calender rolls) | acrylic-styrenic EM colloidal silica in aq-sol. silica composite acrylic EM | slide angle, 25 to 30° |
| Liner printing (with preprinting press) | acrylic-styrenic EM silica composite acrylic EM acrylic melamine EM | slide angle, 35 to 45° heat- and wear-resistant (200° C.) |
| Corrugated board printing (with flexographic printing press) | silica composite acrylic EM microcapsule-containing EM inorganic fine particle containing EM | slide angle, 35 to 50° |

Note: "EM" stands for emulsion.

The paper container of the invention for photo-sensitive materials is specified in such aspects as the basis weights of the liner and the corrugating medium. Despite the use of waste paper, the container of the invention is at least comparable to or even better than the prior art version in the ability to control the possible adverse effects on the photographic properties of the contents, thereby allowing for effective control of the occurrence of damage and the generation of burrs of paper fragments and paper dust during the manufacturing, storage or shipment stages. In a preferred embodiment, the liner is bonded to the medium by means a starch-based adhesive that has high bond strength and which will cause no adverse effects on the photo-sensitive material in the container; hence, the paper container that is manufactured in accordance with the present invention can be stored satisfactorily for a prolonged time and only small amounts of paper fragments and paper dust will be generated during peeling and cutting operations. In addition, the container is cost effective.

What is claimed is:

1. A corrugated box for photo-sensitive materials produced by boxmaking a die-cut sheet of double-faced or double-wall corrugated board having score lines and cutouts, said corrugated board comprising:

multilayer liners, each of which includes at least an inner layer and an outer layer that are made of different materials, said liners having a basis weight (JIS P8124) in the range of 150 to 450 g/m², and each of said liners having higher water absorption in said inner layer; and a medium to which said liners are bonded, said medium having a basis weight (JIS P8124) in the range of 120 to 270 g/m² wherein the water absorption of the outer layer of the liner is 16 to 50 g/m2 as measured by the Cobb test for an absorption time of two minutes.

2. A corrugated box according to claim 1, wherein said double-faced or double-wall corrugated board has 30 to 55 flutes/30 cm at a height of 2.3 to 5 mm, a takeup ratio of 1.30 to 1.65 and a basis weight (JIS P8124) of 120 to 270 g/m² in a medium, and liner-to-medium bonding is achieved by means of a starch-based adhesive.

3. A corrugated box according to claim 2, wherein said starch-based adhesive is such that a carrier solution A having 5 to 25 wt % of a starch swollen and broken down by means of heated water at 40 to 80° C. together with at least 0.2 to 2.0 wt % of sodium hydroxide and a main solution B having 20 to 40 wt % of a starch dispersed in warm water at 20 to 50° C. together with at least 0.3 to 2.0 wt % of borax are mixed in a ratio of A/B=0.3 to 0.7.

4. A corrugated box according to claim 2, wherein said adhesive has a water ratio of 2.0 to 5.0 (relative to the total starch content) and a Zahn cup viscosity (at 40° C.) of 15 to 60 seconds.

5. A corrugated box according to claim 1, wherein said medium has a contact layer which contacts with said inner layer, and said contact layer absorbs more water than said inner layer as measured by the Cobb test.

6. A corrugated box according to claim 1, which has flexographic printing applied to a cut sheet of double-faced or double-wall corrugated board using a rubber plate or a resin printing plate, both having a spring hardness Hs (JISA) of 30 to 55 as measured by the method specified in JIS K6301-1995, and a flexographic ink.

7. A corrugated box for photo-sensitive materials of claim 1 which is produced by boxmaking a die-cut sheet having score lines and cutouts which is converted from a sheet of double-faced corrugated board having 30 to 55 flutes/30 cm at a height of 2.3 to 6 mm and a takeup ratio of 1.30 to 1.70, said sheet of corrugated board being formed by joining a liner having a basis weight of 150 to 450 g/m² to both sides of a medium having a basis weight of 120 to 270 g/m² by means of applying an adhesive to both the single and double facers of a corrugating machine in a respective amount of 3.0 to 6.0 g/m² (to give a total amount of 6.0 to 12.0 g/m²) at a gelatinization temperature of 50 to 65° C., said adhesive being such that a carrier solution A having 5 to 25 wt % of a starch swollen and broken down by means of heated water at 40 to 80° C. together with at least 0.2 to 2.0 wt % of sodium hydroxide and a main solution B having 20 to 40 wt % of a starch dispersed in warm water at 20 to 50° C. together with at least 0.3 to 2.0 wt % of borax are mixed in a ratio of A/B=0.3 to 0.7.

8. A corrugated box for photo-sensitive materials according to claim 1, produced by boxmaking the die-cut sheet of double-faced corrugated board having the score lines and the cutouts and comprising the liner having the paper layers on the outer and inner sides that are made of different materials, wherein the liner has a basis weight (JIS P8124) in the range of 150 to 350 g/m², wherein an angle of slide inclination between a paper container and said corrugated box is 13 to 30 degrees when said paper container has 10 kg of a photo-sensitive material.

* * * * *